Oct. 24, 1967   R. G. GABRIELSON ET AL   3,349,374
SUPERVISORY CONTROL SYSTEM WITH MESSAGE TRAFFIC CONTROL
Filed Aug. 5, 1963                                7 Sheets-Sheet 1

INVENTORS
Reidar G. Gabrielson
Lawrence R. Smith
BY

ATTY'S.

Oct. 24, 1967   R. G. GABRIELSON ET AL   3,349,374
SUPERVISORY CONTROL SYSTEM WITH MESSAGE TRAFFIC CONTROL
Filed Aug. 5, 1963   7 Sheets-Sheet 4

CENTRAL TO REMOTE MESSAGE STRUCTURE

REMOTE TO CENTRAL MESSAGE STRUCTURE

INVENTORS
Reidar G. Gabrielson
Lawrence R. Smith
BY
Mueller & Aichele
ATTY'S.

INVENTORS
Reidar G. Gabrielson
Lawrence R. Smith
BY
Mueller & Aichele
ATTY'S.

INVENTORS
Reidar G. Gabrielson
Lawrence R. Smith
BY
Mueller & Aichele
ATTY'S.

United States Patent Office 3,349,374
Patented Oct. 24, 1967

3,349,374
SUPERVISORY CONTROL SYSTEM WITH
MESSAGE TRAFFIC CONTROL
Reidar G. Gabrielson, Scottsdale, and Lawrence R. Smith,
Phoenix, Ariz., assignors to Motorola, Inc., Chicago,
Ill., a corporation of Illinois
Filed Aug. 5, 1963, Ser. No. 299,859
17 Claims. (Cl. 340—163)

ABSTRACT OF THE DISCLOSURE

A communication system having a central station with a plurality of remote stations. Central station determines the correctness or incorrectness of an incoming message. If incorrect, it sends an all stations retransmit signal. All stations are responsive to such signal to determine whether or not there was a recent message transmission and, if so, to retransmit that message after a predetermined time delay. Each remote station has its own different time delay duration.

This invention relates generally to supervisory control systems, and in particular to message traffic control and security features of a supervisory control system which operates in the quiescent mode.

The quiescent mode of operation of a supervisory control system is that in which information in the form of signals is transmitted between stations only when some change has occurred at a station. In quiescent systems having a central station and a number of remote stations which transmit messages over a common communication channel, information is transmitted to the central station only when there has been a change at a remote station. Similarly, the central station does not transmit to the remote stations unless a command is initiated by an operator. Programmed transmissions may also be scheduled, but these are not relied on as the primary mode of acquisition of change-of-state information, nor for most control functions.

Systems which operate primarily in a scanning mode are far more common than quiescent systems. In the scanning mode, messages are transmitted from the remote stations to the central station in a selected sequence in response to a command or commands initiated at the central station. The obvious advantage of the scanning mode is that there is no possibility of mutual interference between messages, assuming of course that the system is operating properly. On the other hand, for a given message rate, the bandwidth requirement for a scanning system is far greater than for a quiescent system. In practical terms, this means that the communication channel, whether wire line, microwave, radio frequency, or some other media, is considerably more expensive for a scanning system than for a quiescent system.

The quiescent system to be described herein operates such that all remote stations randomly transmit messages via a common communication channel. In the long term operation of the system, it is possible, and in fact likely, that changes will occur at the same or nearly the same time at two or more remote stations causing concurrent transmissions. Consequently, there are bound to be smeared or garbled messages due to mutual interference. Such garbling has been the main problem with quiescent systems, and it has held back more widespread usage of systems of this type.

Garbling of messages by noise on the communication channel, as distinguished from mutual interference between messages, is a more severe problem in a quiescent system than in a scanning system because a given message is ordinarily transmitted only once and therefore can easily be lost if garbled. The next transmission from the same remote station will be a new message since there will be no further transmission until there is a change at that station. Of course the dispatcher can command another transmission if garbling of the initial one is detected, but this requires close and constant observation of the system by the dispatcher and there is always the chance for human errors. The reliability of the system can be improved somewhat by having messages repeated one or more times within each transmission; i.e., by using redundancy techniques. However, this does not prevent mutual interference between messages, and also does not fully compensate for noise on the communication channel.

It is an object of this invention to increase the reliability of supervisory control systems which operate in the quiescent mode.

Another object of the invention is to provide message traffic control in a quiescent system which assures the eventual, correct reception of messages regardless of whether they are initially garbled by mutual interference or by noise on the communication channel.

A further object of the invention is to provide message traffic control with unique message security features which greatly reduce the chance for communication channel noise to be mistaken for a message, or for such noise to so modify a message as to cause undesired control action or undesired reported data.

The invention will be described with reference to the accompanying drawings; in which.

*General system description*

Figure 1:
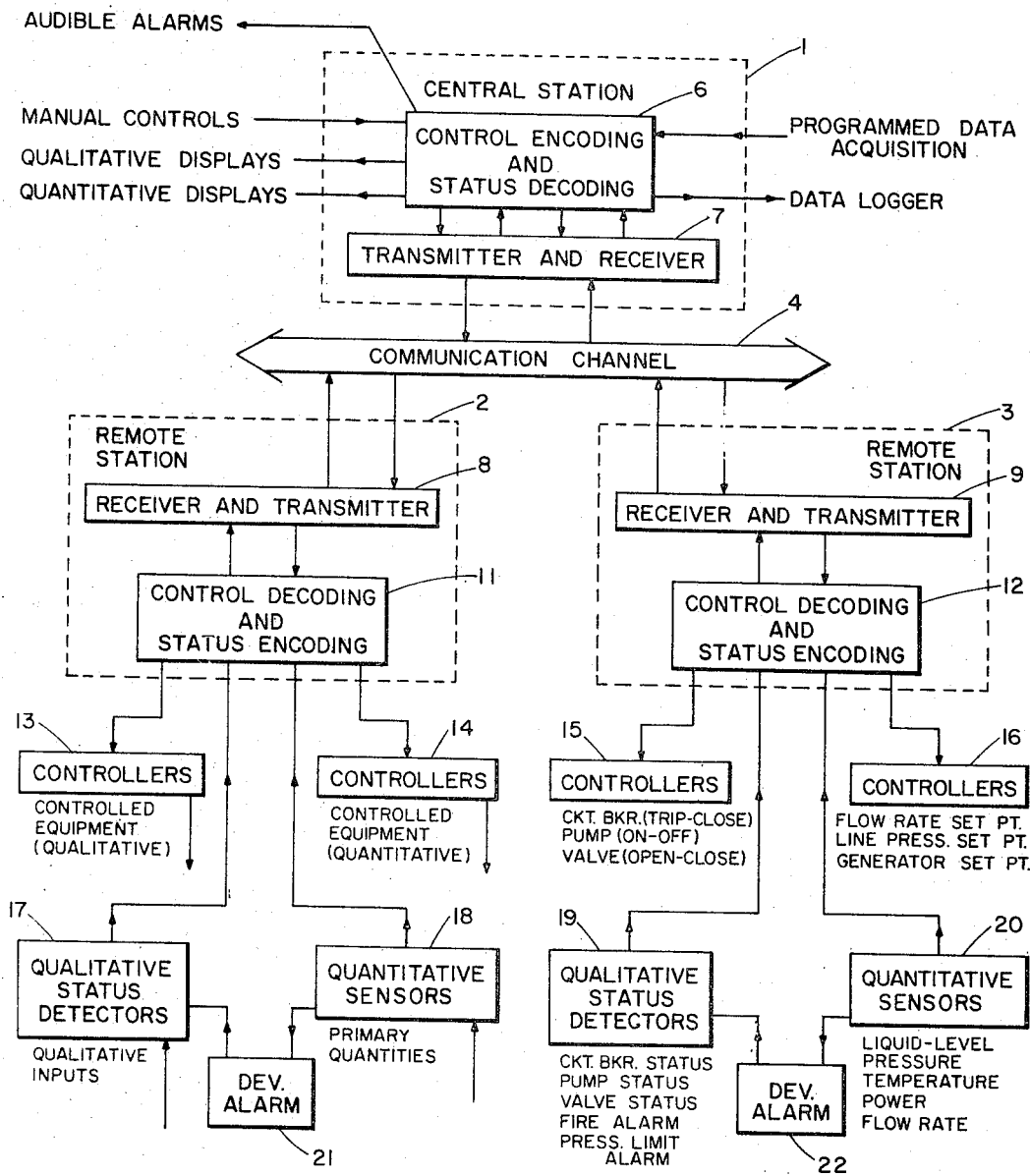
FIG. 1 is a block diagram of a quiescent supervisory control system having message traffic control features in accordance with the invention.

Referring first to FIG. 1, there is shown a supervisory control system in which the message traffic control of the invention may be used. The system of FIG. 1 includes a central station 1 and remote stations 2 and 3. Only two remote stations have been shown, but any desired number of remote stations may be used within practical limits. Messages are transmitted between the central station and the remote stations via the communication channel 4, which has been represented schematically in FIG. 1. The communication channel may be any of several available types; for example, telemetering, teletype, telephone voice line, microwave, VHF or UHF radio.

The particular system shown in FIG. 1 is a digital-type, pulse-code-operated telemetering system, specifically designed for centralized supervision and control of unattended, remotely located distribution facilities, such as petroleum and natural gas pipe lines, power grids, and water conveyance networks. The system is flexible in functional configuration and can include many diverse supervisory and control options. It will be apparent from the description which follows that the utility of the invention and its scope are not limited to the specific embodiment shown in the drawings.

The system of FIG. 1 operates in the quiescent mode. This means that the system is active only when there is information to report to the central station 1 or a control action is commanded by the central station. Therefore, the system can time-share the communication channel 4 with other equipment, if desired.

The messages which are transmitted between the central station and the remote stations are coded in binary form. Two typical methods of pulse keying which can be used for transmitting the binary data are return-to-neuter keying and pulse-duration keying. Return-to-neuter keying will be described herein for illustration, but it will be understood that other suitable methods are available.

The transmission preferably contains three types of bit information; binary one, binary zero, and neuter. When the return-to-neuter keying method is used with the system of FIG. 1, neuter is established as the center frequency. A binary one bit is transmitted as a frequency burst on one side of the neuter frequency, and a binary zero bit is transmitted as a frequency burst on the other side of the neuter frequency. A burst of the neuter frequency is spaced between each of the successive binary bits. Such transmissions have constant duration pulses. Typical message structures will be described later in connection with FIGS. 6 and 7.

In FIG. 1, the basic components and sub-systems of the preferred embodiment are represented by blocks. At the central station 1, there is a control encoding and status decoding sub-system 6, and transmitting and receiving equipment 7. The sub-system 6 is a data processing sub-system. Messages for control and interrogation functions are encoded at the central station 1 and transmitted over the communication channel 4 to the remote stations 2 and 3. The system can be designed for manual, semi-automatic, or fully automatic interrogation and control of remote stations. The selection of the degree of automatic operation to be designed into a system is largely a matter of choice; however, some degree of automatic operation is usually preferred where data logging functions are included in the system.

In manual operation, the operator selects and interrogates remote stations individually in order to obtain quantitative and qualitative information from the remote stations. In semi-automatic operation, the remote stations are scanned in a programmed sequence. The operator initiates scanning, but after that, all operations are automatic. In the fully automatic mode of operation, the remote stations are automatically scanned to obtain quantitative data at fixed time intervals, and no operator action is ordinarily required. However, the operator may initiate an unscheduled check of the entire system or of individual remote stations at any time.

In each case (i.e., manual, semi-automatic and automatic), the system operates as an open-ended quiescent system such that a transmission of qualitative information is initiated *any time* there is a change at a remote station. Thus, operator-initiated transmissions to obtain qualitative status information from the remotes are not ordinarily necessary.

The remote stations 2 and 3 have receiving and transmitting equipment 8 and 9 and control decoding and status encoding sub-systems 11 and 12 which are data processing sub-systems. Incoming messages addressed to the remote station 2 are received, decoded and routed to one of the two types of controllers 13 and 14 included in that remote station. The controllers 13 are for controlled equipment where the control action is qualitative, and the controllers 14 are for controlled equipment where the control action is quantitative, as indicated at the outputs of the controllers 13 and 14.

The remote station 3, and all other remote stations, also have the same two types of controllers. The controllers for the remote station 3 are designated 15 and 16 in FIG. 1, and specific examples of the two types of controlled equipment (qualitative and quantitative) have been indicated at the outputs of the controllers 15 and 16. It will be apparent that the control action for the qualitative type is a two-state action. The circuit breakers are either tripped or closed, the pumps are turned either on or off, and the valves are either opened or closed. The control action for the quantitative type is a continuous function, and specific examples of this type of control are adjustment of a flow rate set point, adjustment of a line pressure set point, and adjustment of a generator set point, as indicated in FIG. 1.

There are two types of inputs at the remote stations: qualitative inputs which are fed to the qualitative status detectors 17, and quantitative inputs which are fed to the quantitative sensors 18 for the remote station 2. Specific examples of these two types of inputs are shown at the input lines leading to the qualitative status detectors 19 and the quantitative sensors 20 for the remote station 3. In the qualitative category, the examples shown are circuit breaker status, pump status, valve status, fire alarm, and pressure limit alarm. These inputs are obviously of the two-state type. In the quantitative category, the examples shown are liquid-level, pressure, temperature, power and flow rate. The latter inputs are continuous variables.

For data acquisition and logging purposes, the remote stations are interrogated by the central station, and quantitative information in signal form is supplied from the sensors 18 and 20 to the encoding section of the sub-systems 11 and 12 where it is encoded into messages. The messages are transmitted to the central station where they are decoded and displayed, and a data logger for such quantitative information may also be provided as indicated at the corresponding outputs for the central station.

Figure 2:
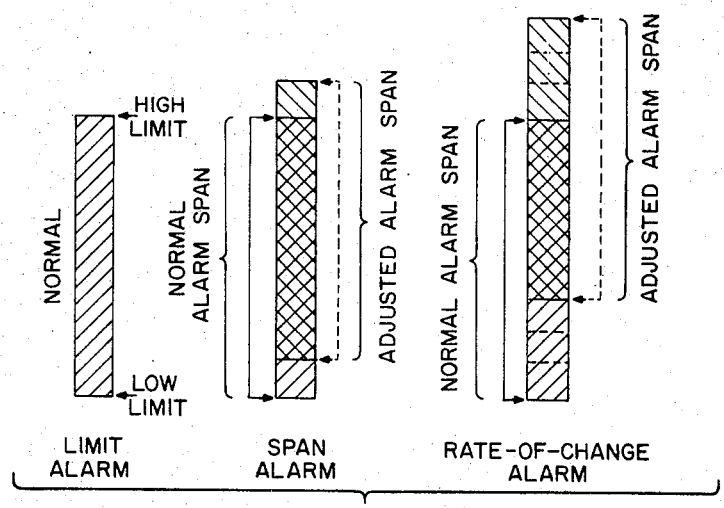
FIG. 2 illustrates schematically three types of alarm functions which can be used in the system.

In connection with quantitative data acquisition functions, the system may be provided with an alarm feature which is qualitative in nature. As shown at the remote stations in FIG. 1, there are deviation alarms 21 and 22 in the signal path between the quantitative sensors and the qualitative status detectors. Three different alarm functions can be provided at the remote stations: limit alarm, span alarm, and rate-of-change alarm. The manner in which these alarms operate will be described with reference to FIG. 2. The limit alarm is the simplest of the three; it can consist of either a high alarm point or a low alarm point, or it may have both high and low limits.

The span alarm incorporates adjustable high and low limits. These limits define the normal operating span of a variable which is an input to the quantitative sensors. If the variable exceeds either limit, the remote station transmits an alarm message and updates the corresponding central station display. After transmission of the alarm and updating of the display, the two limits are automatically changed so as to bracket the new operating span. In this way, the alarm tracks the off-normal condition.

A variation of the span alarm provides an alarm delay in order to allow for tolerable, transient fluctuations in the variable. Here, an alarm signal is transmitted only after the variable has exceeded either of the span limits a predetermined number of times. The central station quantitative display, however, is updated with each successive increase or decrease as it occurs.

The rate-of-change alarm provides a time derived alarm function. The alarm point is set at a percentage of the range of the quantitative sensor such as 18 and 20. When the variable exceeds this limit, a deviation detector included in the alarms 21 and 22 registers a count. At the same time, the alarm point is stepped to the new level of the variable. This stepping action tracks the variable's progress. Timing pulses are simultaneously compared with the counts registered in the deviation detector. If a predetermined number of counts are accumulated in a finite period of time, a rate-of-change alarm message will be encoded and transmitted to the central station. Two successive messages are sent. The first contains an alarm bit which actuates the central station alarms and also updates the qualitative status displays. The second message updates the quantitative readout of the variable which is supplied to the data logging equipment.

An example of a deviation detection and alarm subsystem which may be used in the supervisory control system of FIG. 1 is described and claimed in a copending application of Lawrence R. Smith, Ser. No. 258,992, filed on Feb. 18, 1963, and assigned to the present assignee.

The manner in which qualitative status information is detected at the remote stations, transmitted to the central station and displayed on qualitative displays is apparent from inspection of FIG. 1. Likewise, the manual control input and the programmed data acquisition input at the central station are self-explanatory.

*Detection and control of smeared messages*

The manner in which smeared messages are detected and controlled so as to assure accurate reception of messages at the central station 1 will be described with reference to the schematic drawing of FIG. 3. This drawing is something like a flow chart and depicts the sequence of steps by which smeared messages are handled. The terms "smear" and "garble" are used interchangeably herein and refer to messages which have been altered in transmission either by mutual interference, noise, fading or some other disturbance to the extent that they are not correct or adequately "intelligible" as received at the addressee station.

Figure 3:
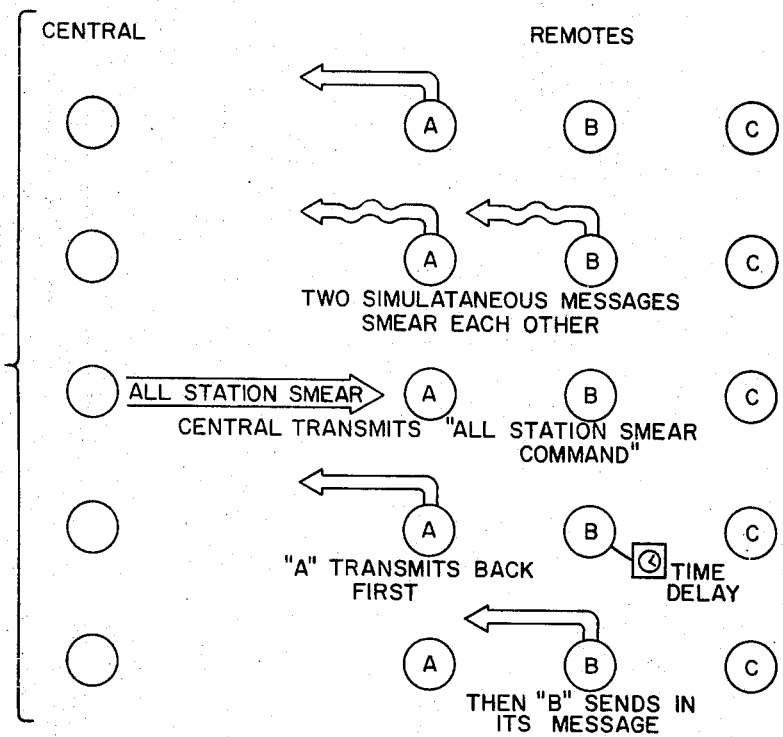
FIG. 3 is a simplified schematic diagram showing the manner in which messages are controlled in the system of FIG. 1 in order to assure the eventual correct reception of messages.

In each line of FIG. 3, the central station is represented by the circle at the left, and there are three remote stations represented by circles A, B and C at the right. The top line in FIG. 3 shows the remote stations transmitting a message to the central station. The message is transmitted as soon as a change occurs at station A. Thus, the top line merely depicts the normal quiescent mode of operation of the system.

The second line in FIG. 3 shows messages being transmitted concurrently from remote stations A and B. As previously mentioned, this can happen easily since changes may occur at two or more remote stations at the same or nearly the same time. As indicated in the drawing, the two messages smear each other. The central station detects the smeared or garbled condition of the message and rejects it. In order to correct the situation, the central station sends out a command, called an "all stations smear command," as shown in the third line of FIG. 3.

The smear command is received by all of the remote stations, and its purpose is to cause the last transmission to be repeated. Only those stations which have transmitted a message within a fixed time interval previous to reception of the smear command will repeat that message. The messages must be repeated on a staggered schedule in order to prevent them from smearing each other again. In order to accomplish this, a timer is built into each of the remote stations, and the timers are set such that the remote stations will restransmit their messages one after the other. Such scheduled retransmissions are depicted in the fourth and fifth lines of FIG. 3 where remote station A transmits back first, and then remote station B sends in its message.

The same kind of operation will take place if a message is smeared by noise on the communication channel, rather than by mutual interference as shown in FIG. 3. When a single message is smeared by noise, only the station which transmitted that message will retransmit in response to the smear command. Each of the remote stations may be equipped with smear detection and control circuitry, if desired, so that if a message transmitted from the central station is smeared by noise on the communication channel, a remote station will send back a smear command which causes the central station to retransmit.

The message traffic control features of the system greatly reduce the chance that noise will be mistaken for a valid message. If noise is received by a station at a level sufficient for it to be detected as a message, it is processed just like a smeared message. The receiving station sends out a smear command, but since none of the other stations have transmitted within the preceding reference time interval, there will be no return message. In this way, the system verifies that the signals which appeared at the receiving station were noise and not a message.

Since noise on the communication channel could last for a long time, it is possible that there will still be noise on the channel after the receiving station sends out a smear command. If so, the receiving station will again process the noise as a smeared message, send out another smear command, and such cycling will continue until the noise condition is eliminated.

The message traffic control features of the system thus assure that smeared messages will eventually be correctly received, and also assures that noise will not be mistaken for a message. An example of circuits for accomplishing such message traffic control will be described later in connection with FIGS. 8 and 9.

*Equipment for central station and remote stations*

Figure 4:
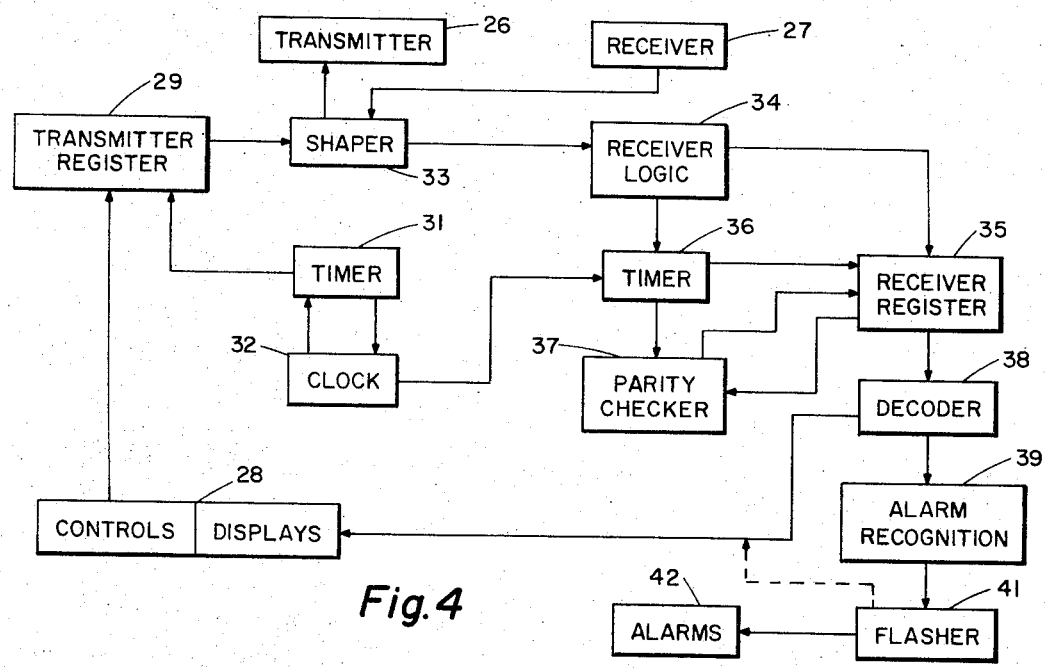
FIG. 4 is a block diagram of the central station included in the system of FIG. 1.
Figure 5:
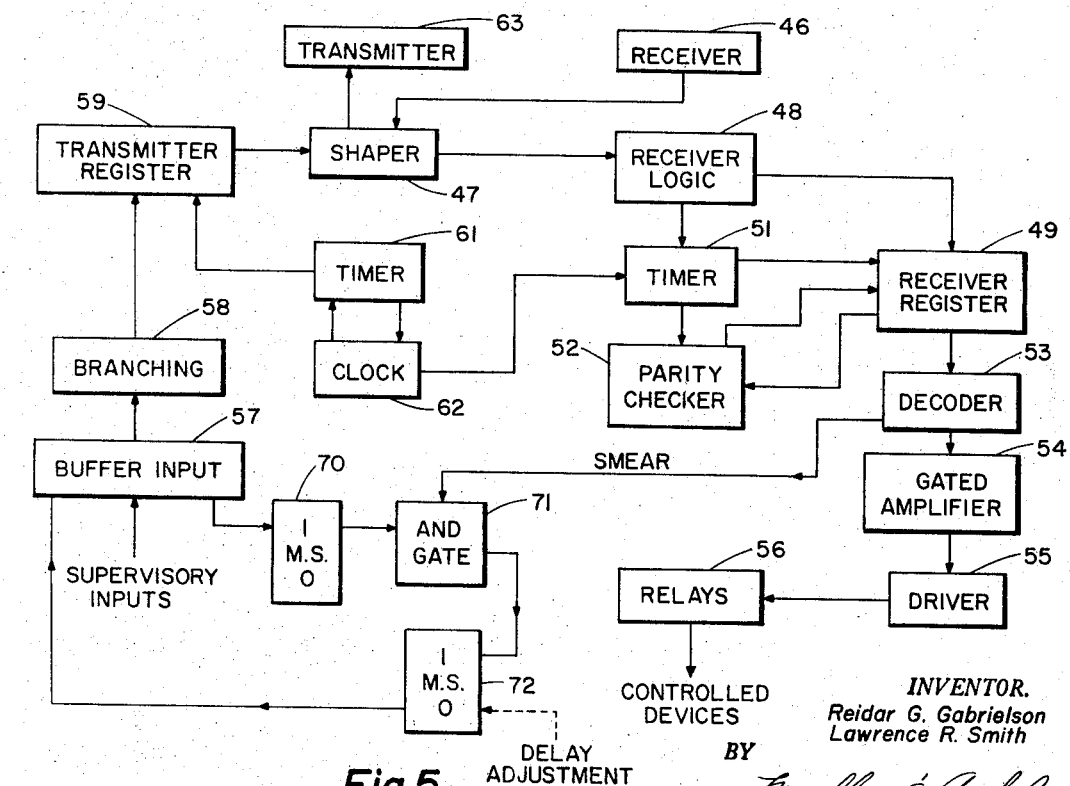
FIG. 5 is a block diagram of a remote station.

FIG. 4 shows the basic components of a central station and FIG. 5 shows the components of a remote station for the system of FIG. 1. The central and remote stations of FIGS. 4 and 5 are for a preferred embodiment of the invention, but it will be understood that modifications are possible.

The central station (FIG. 4) includes a transmitter 26 and a receiver 27. The central station equipment is controlled by means of switches and other controls provided in a control console 28. For manual operation, the dispatcher selects and initiates the transmission of a message by actuating the appropriate switches on the control console. Contacts within the console load the message in parallel form into a shift register 29 for the transmitter. The transmitter register shifts out the message serially in response to pulses which are supplied to it from a timer 31 which is controlled by a clock 32. The message is supplied from the register 29 to the shaper 33 which adjusts pulse width and amplitude in the message for compatibility with the communication channel and then sends the message to the transmitter 26 for transmission to the remote station.

The reply message from the remote station is coded with a long neuter (center-frequency) at its beginning. The long neuter information causes the squelch on the central station receiver to open and permits the message to be converted to voltage pulses in the receiver. The message pulses proceed serially through the shaper 33 and the receiver logic module 34 to the receiver shift register 35. The message pulses are also supplied through the receiver logic 34 to the timer 36 and the parity checker 37 which check the pulse count and the overall time duration of the message. If the count and time duration are not correct, the message will not be routed to the display portion of the control console 28. Failure of a confirming display to appear notifies the operator that the mesage has been smeared and retransmission is necessary.

On the other hand, if the count and time duration of the message are correct as determined by the timer 36 and parity checker 37, the latter modules will cause the receiver register 35 to shift out the message in parallel to the decoder 38. Here, the message is decoded into its sender's address (identity), and its qualitative or quantitative information content.

After decoding, the signals are amplified and then routed to the appropriate displays in the control console 28. At the same time, the alarm recognition module 39 checks the message for alarm content; if an alarm function is contained in the message, the flasher 41 and the alarms 42 are actuated. The functioning of alarms has been described previously.

The basic components of a remote station are shown in FIG. 5, and it will be apparent that it is composed of the same modules as the basic central station, but in addition contains a gated amplifier, a driver, branching and buffer input modules, and smear timing circuits 70, 71 and 72. Naturally, the remote station does not have a control console since it is unattended.

A message received at the remote station is sent from the receiver 46 through the shaper 47 and the receiver logic 48 to the receiver shift register 49. The message security modules, that is, the timer 51 and the parity checker 52, determine the pulse count and the over-all time duration of the message in the same manner as previously described in connection with the central station. If the message is found to be valid, the timer and parity checker cause it to be transferred out of the receiver register 49 in parallel form and sent to the decoder 53.

The decoder 53 includes address recognition circuitry which determines whether the message received is one addressed to that particular remote station. If the address recognition circuits determine that the message is not addressed to the remote station in question, the message will be rejected and there will be no output from the decoder. This address checking may be carried a step further such that the decoder determines whether the command information included in the message is a function assigned to that remote station. If not, the message will be rejected.

If the message passes the address and command code checks, it is decoded and sent through the gated amplifier 54 and the driver 55 to the interposing relays 56. The relays then operate the appropriate controllers or initiate the acquisition of quantitative information, depending upon whether the message is one calling for control action or quantitative information.

After the message has been acted upon, the reply is routed through the buffer input 57 to the branching module 58. If the reply is qualitative information, it will merely confirm the changed status of the controlled devices which have been acted upon. If the reply is quantitative information, it will come from a sensor such as 18 and 20 in FIG. 1.

The branching module 58 routes the reply messages (if there is more than one message) into the transmitter shift register 59. In response to pulses supplied from the timer 61 and the clock 62, the message is shifted out serially from the register 59, and after processing by the shaper 47 it is sent to the central station by the transmitter 63.

As previously mentioned, the remote station initiates a transmission whenever there is a change of status at the remote station. This is brought about by the buffer input module 57, which continuously monitors status-indicating contacts associated with the controlled devices. Any change in the position of the contacts since the last transmission from the remote station will cause the buffer input to initiate transmission of a new message to the central station for reporting the change of condition.

Figure 6:
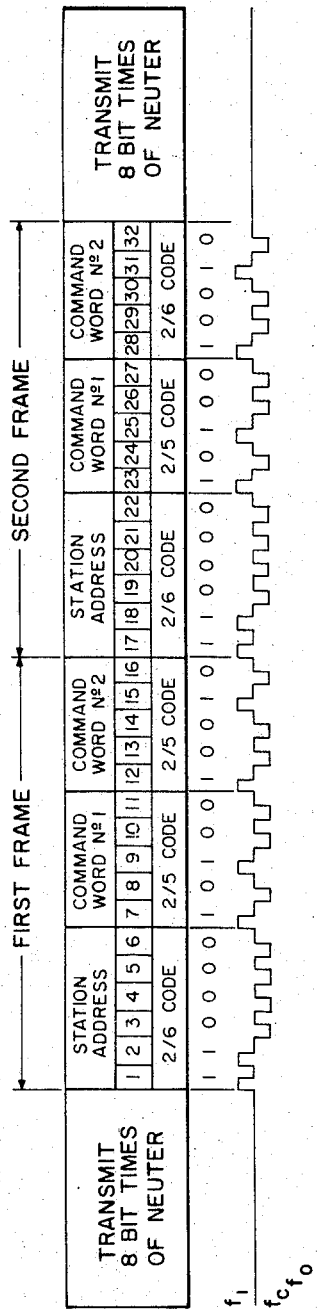
FIG. 6 shows the bit structure of a typical central-to-remote message.

The bit structure of a typical central-to-remote message is shown in FIG. 6. It will be understood that various message codes are available for a system of this type, and the specific examples presented here are for purposes of illustration only.

The messages transmitted from central-to-remote and from remote-to-central differ in both length and structure. Messages originating at the central station consist of two identical frames as shown in FIG. 6. The frames, in turn, are comprised of three unique words: an address word and two command words. The address word is coded in a 2/N code with sufficient bits to accommodate all of the remote stations in the system. The command words are also coded in a 2/N code and provide the specific commands for operating controlled equipment at the remote stations. If the command words are for the purpose of adjusting a set point, they may be coded in binary-coded decimal form.

Figure 7:
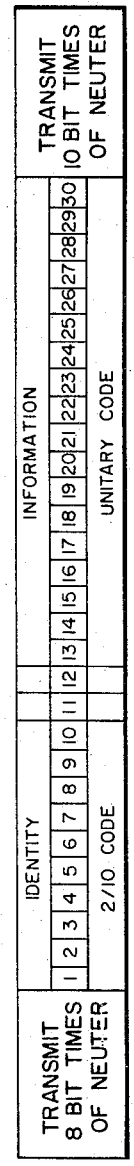
FIG. 7 shows the bit structure of a typical remote-to-central message.

The remote-to-central message shown in FIG. 7 is a single frame consisting of two discrete words: the identity or sender's address word, and the information word which may contain either qualitative or quantitative information. The identity word is coded using a 2/N code in this example. The coding of the information word differs depending upon whether the information is qualitative or quantitative. Discrete bit coding (unitary code) is used for qualitative information, and binary-coded-decimal is used for quantitative information.

In FIGS. 6 and 7, the pulse structure of the messages is shown beneath the individual message configurations. The frequency which represents a one bit is $f_1$; $f_0$ is the frequency which represents a zero bit; and $f_c$ is the center frequency which represents a neuter bit. It may be seen that a neuter bit is transmitted between all binary bits. In the example shown in FIG. 6, the message consists of thirty-two binary bits; six binary bits are used for the station address, and there are two command words each with five binary bits. The reason for using two identical frames is to increase security of central-to-remote messages. At the remote station, the two frames are compared bit-by-bit and must be identical or no action will take place.

In the example shown in FIG. 7, the remote-to-central message consists of thirty binary bits. The first ten binary bits of the message form the identity word, and the remaining twenty binary bits are used for qualitative information. Each binary bit of the qualitative information word is assigned to a particular controlled device such as a circuit breaker, pump or the like. Open circuit breakers are encoded as binary one bits, and closed circuit breakers are coded as binary zero bits. Alarms are transmitted as binary zero bits for normal conditions and as binary one bits for abnormal conditions.

*Message traffic control circuitry*

Figure 8:
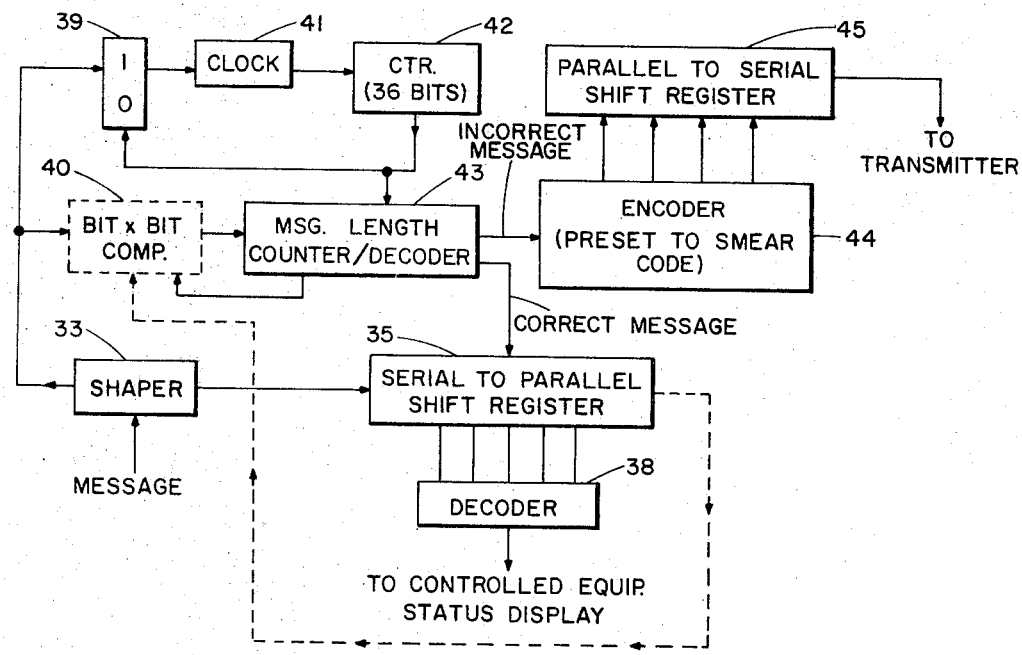
FIG. 8 is a functional block diagram for the equipment at the central station which provides detection and control of smeared messages.

FIG. 8 is a block diagram of the message control circuitry which is included in the central station equipment. The same type of circuitry may be included in each of the remote stations, if desired.

The incoming message is supplied to the shaper 33 and is examined by the shaper to determine if it is of sufficient level to be recognized as a message. The shaper converts the voltage pulses to current pulses and directs them to the serial-to-parallel shift register 35, as previously explained in connection with FIG. 4.

The first bit of the message opens a gate 39 which in turn enables the clock 41 so that it supplies clock pulses to the thirty-six bit counter 42. The output of the shaper 33 is also supplied to the message length counter (disregarding for the time being the bit-by-bit comparison circuit 40 shown in dotted lines). For each incoming binary bit, the message length counter 43 registers one count. Since in this embodiment the message is only thirty-two binary bits in length, the message length counter will count thirty-two bits and then stop. After the thirty-six bit counter 42 has counted thirty-six clock pulses, it produces an output which reads the count in the message length counter 43.

If the count in the message length counter 43 is correct (i.e., thirty-two bits), a "correct message" output is sent to the shift register 35, causing the information stored there temporarily to be transferred out in parallel to the decoder 38. However, if the count in the message length counter 43 is less than or greater than thirty-two bits, the counter 43 produces an "incorrect message" output which triggers the encoder 4.

The encoder 44 has previously been loaded or preset with the code for the "all stations smear command." This smear command is read out of the encoder in response to the output from the counter 43, and the command is converted to serial form by the parallel-to-serial shift register 45. The all stations smear command goes from the shift register 45 to the transmitter 26 (FIG. 1) of the central station which sends it out to all of the remote stations.

Each of the remote stations has smear timing circuits 70–72 (FIG. 5), and each timer is set for a slightly different delay than the others. Decoding of the all stations smear command starts the timers only in those stations which have transmitted within a fixed preceding period of time, thus staggering retransmission from those stations.

At a remote station (FIG. 5) the smear command is received and decoded like any other message. However, the decoder 53 is designed to recognize the smear command and supply a smear output to the "and" gate 71. The other input to the gate 71 is supplied from a delay-type monostable multivibrator 70 which is always activated by the buffer input module 57 when a qualitative-type transmission is initiated. Thus, every time a message containing qualitative information is transmitted from a remote station, its smear timing circuitry is started. This could also be done for messages containing quantitative information, but since acquisition of such data is ordinarily commanded, the smear control technique need not be applied to them. The purpose of the first timer 70 (a delay-type monostable multivibrator) is to supply a timed input into the "and" gate 71 sufficiently long to allow for transmission of the message and return of the all stations smear command. If a smear command is received during the first timing cycle, the and gate 71 enables the timer 72 to cause retransmission of the qualitative message at the end of a second timing cycle. If a smear command is received after the end of the first timing cycle, the and gate 71 will not start the second timer 72, so there will be no retransmission in this case.

Upon actuation of the gate 71 by both of its inputs, the gate enables the second timer 72, which is also a delay-type monostable multivibrator. The time required for this circuit to cycle from its "zero" state to its "one" state and back to its "zero" state is preset, as indicated by the delay adjustment input for this circuit in FIG. 5. Upon returning to the zero state, the circuit 72 delivers an output to the buffer input 57 which causes the last transmission to be repeated.

Summarizing, the first timer starts its cycle responsive to transmission of a qualitative-type message. The "and" gate requires actuation by the first timer, and also by the decoder responsive to reception and decoding of a smear command during the first timing cycle, to start the second timer. The second timer in turn causes retransmission at the end of a second timing cycle of the message originally transmitted at the beginning of the first timing cycle. As previously mentioned, the second timers 72 in the various remote stations have timing cycles of different durations so as to stagger retransmissions and thus assure the eventual correct reception of messages.

Returning now to the bit-by-bit comparison circuit 40 of FIG. 8, this is an additional security feature which may be included in the central and/or the remote stations for applications where increased security of messages is desired. The incoming message, in addition to driving the shift register 35, is also routed to the comparison circuit 40. The shift register 35 has only a sixteen binary bit capacity, whereas the total message contains thirty-two binary bits with two identical sixteen-bit frames.

After the message length counter has counted sixteen binary bits, it produces an output which enables the comparison circuit 40, and then continues counting. At the time of this output, the shift register 35 is fully loaded with the first message frame. As the second message frame arrives, it is supplied directly to the comparison circuit 40 and to the shift register 35. The second message frame entering the shift register will shift out the first frame serially, a bit at a time, and this output from the shift register may be thought of as the first message frame delayed.

The delayed first message frame is fed to the comparison circuit 40 which compares it with the second message frame arriving at the same time directly from the shaper 33. Each bit of the delayed first frame should be identical to the corresponding bit of the second frame. If the first single bits of the two frames are identical, the comparison circuit generates a single output pulse which is fed into the message length counter 43. Then the second bits of both frames are compared and, if they are alike, the comparison circuit feeds another pulse to the message length counter. Thus, the message length counter will count thirty-two bits only if all bits of both frames are identical. If they are not identical, the message length counter will not produce a "correct message" output when it is read and reset by the thirty-six bit counter 42, as previously explained.

The reason for making the counter 42 have a capacity greater than thirty-two bits is to permit the message length counter 43 to accumulate an over count (i.e., more than thirty-two) if the message has too many bits. In this case, a "correct message" output will not be produced when counter 42 interrogates counter 43 at the end of thirty-six bits. In this manner the message length counter guards against both short and long messages. In order to prevent the system from being tied up by occasional short duration noise bursts, the counter/decoder 43 can be designed such that it will not produce an "incorrect message" output if the count stored in it at read time is less than a predetermined number of bits, such as eight bits for example.

Figure 9:
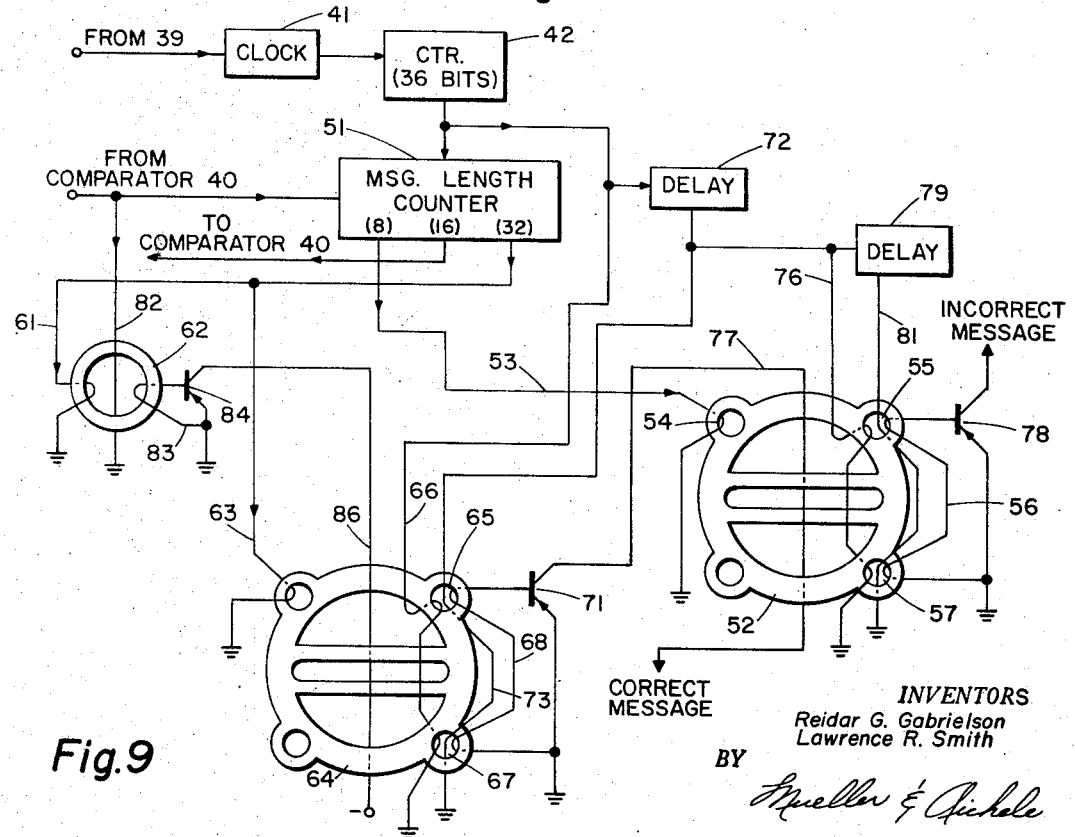
FIG. 9 is a circuit diagram showing particularly a decoder included in the equipment of FIG. 8 which distinguishes between correct messages and incorrect messages.

FIG. 9 shows an example of circuitry for the decoder portion of the message length counter/decoder 43. Multiaperture cores of square loop ferrite material are used in this circuitry and also in the circuitry shown in FIGS. 10–13. The particular multiaperture core shown here is described and claimed in a patent application of Lawrence R. Smith, Ser. No. 109,440, filed on May 11, 1961, and assigned to the present assignee now Patent 3,217,300. This core is known as a true and complement core, and one of its primary advantages is that it provides noise cancellation in the output winding for the core such that its operation is not nearly as dependent on the threshold characteristics of the square loop ferrite material as other known multiaperture cores. In order to provide a more complete description of the true and complement core and its advantages, the disclosure of application Ser. No. 109,440 is incorporated herein by reference.

The clock circuit 41 is simply an oscillator which provides accurately timed pulses in a well-known manner and therefore is not shown in detail. The thirty-six bit counter 42 and the message length counter 51 may be constructed in accordance with the disclosure of a copending application, Ser. No. 298,264, filed on July 29, 1963 by William B. Buehrle and Lawrence R. Smith and assigned to the assignee of this application. As described in that application, true and complement ferrite cores may be used in the counter so as to take advantage of their noise cancellation features. The message length counter 51 counts pulses supplied from the bit-by-bit comparison circuit 40, as previously described. The counter 42 counts the clock pulses, and at the time of the thirty-sixth count supplies a pulse to the counter 51 which reads the count stored in the latter counter.

As shown in FIG. 9, outputs are derived from the message length counter 51 at the eighth, sixteenth and thirty-second counts. The output produced at the eighth count sets a one into the true and complement core 52. The setting of this core is in accordance with the description of application Ser. No. 109,440. Briefly, the current pulse in the input circuit 53 passing through the minor aperture 54 causes flux to switch about the upper major aperture and thereby establishes continuous flux locally about the output minor aperture 55. This flux can later be switched so as to produce a voltage in the output winding 56, which links the outer leg at aperture 55 and links the outer leg at aperture 57 in the opposite sense.

The output pulse from the counter 51 which is produced at the thirty-second count is supplied to the input winding 61 for a toroid core 62 and also to the input winding 63 for another true and complement core 64. The current pulse in winding 61 switches flux about the toroid 62 in a sense such that it tends to keep the transistor 84 turned off. The current pulse in the input winding 63 for the true and complement core 64 sets a "one" into the core by switching flux about the upper major aperture to thereby establish continuous flux about the output aperture 65.

If the incoming message was correct (that is, it contained exactly thirty-two binary bits), the message length counter 51 will count up to thirty-two and stop. The counter 42, however, continues to count up to thirty-six. Upon receiving the thirty-sixth clock pulse, the counter 42 supplies an output pulse to the message length counter 51 and also to the priming circuit 66 for the core 64. The current pulse in the priming circuit 66 reverses flux locally about the output aperture 65 of core 64, but the voltage induced in the output winding 68 for this core is of a polarity which tends to keep the transistor 71 turned off.

The pulse from the counter 42 passes through a delay network 72 and this delayed pulse is supplied to the reading winding 73 for core 64. This reading winding passes through apertures 65 and 67 in the same sense, but in the direction opposite to that in which the priming winding 66 passes through those apertures. Therefore, the current pulse in the reading winding reverses flux again about aperture 65 so as to induce a voltage in the output winding 68 which turns transistor 71 on. The firing of transistor 71 produces a current pulse in its collector circuit which is the "correct message" output that is fed to the shift register 35 as shown in FIG. 8.

The current pulse from the delay network 72 is also fed to the priming winding 76 for the other true and complement core 52, and the priming pulse in winding 76 tends to reverse flux locally about the output aperture 55. However, the pulse which is produced in the collector circuit of transistor 71 is concurrent with the priming pulse in winding 76, and appears in the blocking winding 77 for core 52 at the same time as the priming pulse appears in winding 76. The M.M.F. due to the blocking pulse overrides that due to the priming pulse and returns the core 52 to its blocked condition.

The pulse from the delay network 72 passes through another delay network 79 and from there to the reading circuit 81 for the core 52. Since the core 52 has already been blocked by the time the delay reading pulse appears in winding 81, no output will be produced in winding 56 at read time, and the output transistor 78 will not be fired. Thus, a "correct message" pulse is delivered to the shift register 35, but an "incorrect message" pulse is not delivered to the encoder 44 (FIG. 8).

Consider now the abnormal condition where the message contains more than thirty-two bits. When the message length counter 51 has counted up to thirty-two, an output is delivered to the input winding 61 for the toroid core 62 which sets that core. The next incoming pulse from the comparison circuit 40 is supplied to the reading winding 82 for the core 62. The read pulse reverses flux about the core 62 and this induces a voltage in the output winding 83 which turns the transistor 84 on. The firing of transistor 84 produces a current pulse in its collector circuit which is supplied to the blocking winding 86 for the core 64. Thus, although the core 64 has been set by the output pulse from the counter 51 at the time of the thirty-second count, it is returned to its blocked condition at the time of the thirty-third input pulse to the counter 51. After the core 64 has been blocked, the priming and reading pulses which are produced in windings 66 and 72 after the counter 42 has counted up to thirty-six will not produce an output pulse in the output winding 68 for core 64.

The output from the thirty-six bit counter 42 is, however, routed through the delay network 72 to the priming winding 76 for the other true and complement core 52, and as previously explained, a delayed reading pulse is produced in winding 81 for the core 52. In accordance with the previous description, the core 52 was set at the time of the eighth count in the message length counter 51. The priming pulse in winding 66 then reverses flux locally about aperture 55 but does not turn transistor 78 on. After a short delay, the reading pulse in winding 81 again reverses flux about aperture 55, and this induces a voltage in the output winding 56 which turns transistor 78 on. The firing of transistor 78 produces a current pulse in its collector circuit which is the "incorrect message" output that is supplied to the encoder 44 as shown in FIG. 8.

In FIG. 9, it may be noted that at the time the sixteenth count is registered by the counter 51, an output is supplied by the counter to the bit-by-bit comparator 40. As has been mentioned, the comparator 40 includes a gate, and the gate operates such that the first sixteen pulses from the shaper 33 are gated directly to the message length counter/decoder 43 (FIG. 8). At the sixteenth count, the output from the counter/decoder 43 changes the condition of the gate such that the comparison circuit compares the next sixteen input pulses from shaper 33 with the delayed first message frame supplied from the shift register 35 via the dashed-line path in FIG. 8. Thus, for the second sixteen bits, the message length counter 43 is really counting comparisons made by the comparator circuit 40.

Figure 10:
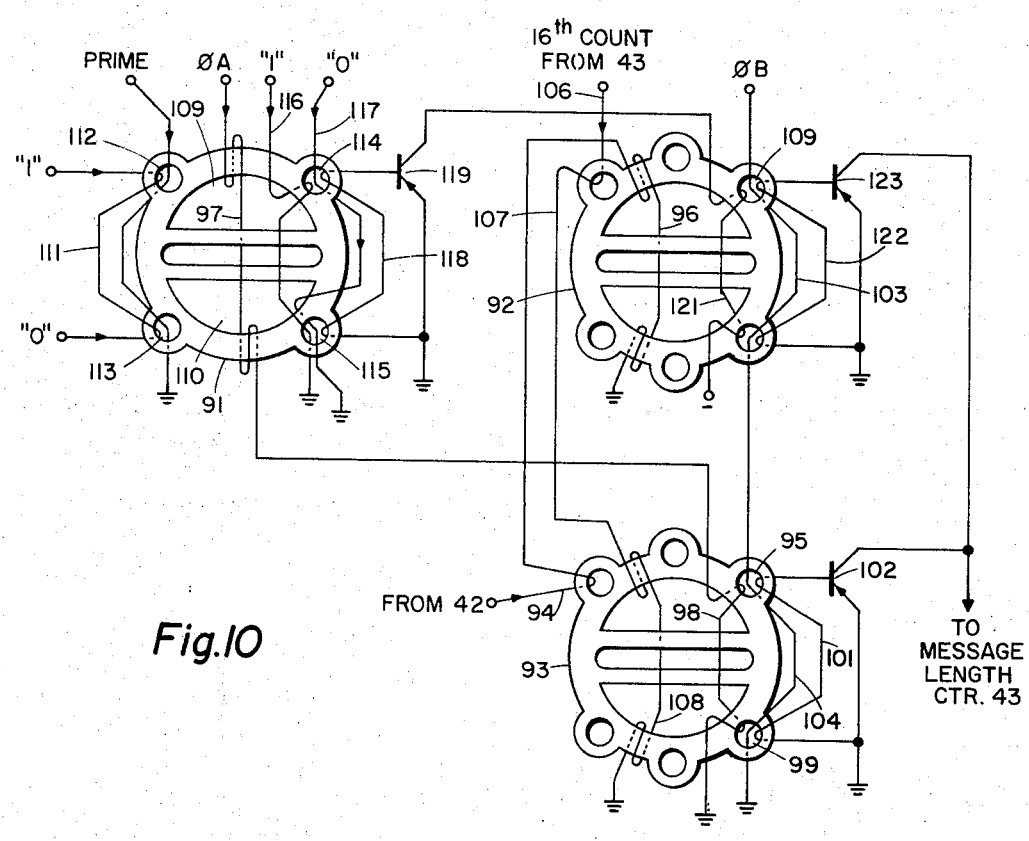
FIG. 10 is a circuit diagram of a bit-by-bit comparison circuit included in FIG. 8 for detecting incorrect messages to provide message security.
Figure 11:
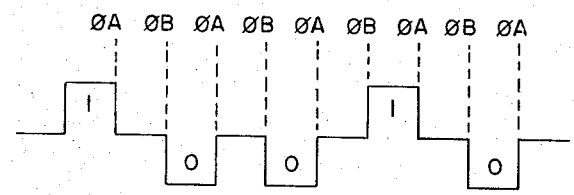
FIG. 11 shows a waveform which will be explained in connection with the description of FIG. 10.

An example of a specific circuit for the comparator and the gate included in it is shown in FIG. 10. FIG. 11 is a pulse waveform which will be explained in connection with the description of FIG. 10. Again, it may be noted that this circuitry uses the true and complement core of application Ser. No. 109,440. The core 91 and its associated windings constitute the bit-by-bit comparator, and the two cores 92 and 93 with their windings are the gating circuit for the comparator (FIG. 9).

Referring first to FIG. 11, there is shown a portion of a message which includes two binary bits and three binary zero bits with neuter bits between all of the binary bits. At the trailing edge of each binary bit, a pulse is produced by clocking circuitry (not shown), and these pulses will be referred to as phase A pulses ($\phi A$). At the leading edge of each of the binary bits, a pulse is produced by other clocking circuitry (also not shown), and these pulses will be referred to as phase B pulses (φB). The phase A and phase B pulses serve timing functions as will be described in connection with FIG. 10.

At the end of every message, the thirty-six bit counter 42 supplies a pulse to the input winding 94 for the core 93, and this pulse establishes continuous flux about the output aperture 95. The input winding 94 for the core 93 is connected to the blocking winding 96 for the other gate core 92, and thus the thirty-six count pulse from counter 42 blocks core 92. When the next message comes in via the shaper 33 (FIG. 8), the core 93 will be in a set condition and the core 92 will be in a blocked condition.

The first sixteen bits of this next message are gated via the core 93 to the message length counter 43. The operation of the core 93 and its associated windings in accomplishing the gating function is as follows. At the trailing edge of the first binary bit of the message, a phase A pulse is produced as indicated in FIG. 11. The phase A pulse is fed to a series circuit which includes the blocking winding 97 for the comparator core 91, and also a priming winding 98 which links the output apertures 95 and 99 of the gate core 93. The phase A pulse reverses flux locally about aperture 95 (since that aperture has been set), but any voltage induced in the output winding 101 for the core 93 is of a polarity which tends to keep the transistor 102 turned off.

Next, a phase B pulse is produced at the leading edge of the second binary bit of the message. The phase B pulse is fed to a series circuit which includes the reading winding 103 for the gate core 92 and also the reading winding 104 for the other gate core 93. Since core 92 is in the blocked condition, a phase B pulse in winding 103 does not affect it. However, the phase B pulse in winding 104 for the other gate core 93 again reverses flux locally about aperture 95 inducing a voltage pulse in the output winding 101 which is of a polarity and has sufficient amplitude to turn transistor 102 on. The firing of transistor 102 produces an output pulse in its collector circuit which is supplied to the message length counter 43, and the counter 43 registers a count of one.

The phase A pulse at the end of the second binary bit of the message primes core 93, and the subsequent phase B pulse reads core 93 such that another output pulse is supplied from transistor 102 to the message length counter. The counting cycle continues in the same manner through the first sixteen bits of the message.

At the end of the sixteenth count registered by counter 43, a pulse is fed back to the bit-by-bit comparison circuit and enters at terminal 106 in FIG. 10. This pulse is fed through the input winding 107 for the gate core 92 and also through the blocking winding 108 for the other gate core 93. The current pulse in winding 107 sets core 92 such that it then has continuous flux about its upper output aperture 109. The same pulse blocks core 93 so that subsequent phase A and phase B pulses will not affect it.

The circuit 40 is now conditioned to compare the second message frame with the delayed first message frame from the shift register 35 on a bit-by-bit comparison basis. This comparison is accomplished by the core 91 and its windings in the following manner. If the seventeenth binary bit is a "one," clockwise current will be produced in the input winding 111 for the core 91. This input winding links the upper and lower input apertures for core 91 in an opposed sense such that the "one" input will establish continuous flux about the upper output aperture 114. After setting, flux will remain discontinuous at the other output aperture 115. At the same time that the binary one input is received by input winding 111 from the shift register 35, another binary one input should be received from the shaper 33 (FIG. 8). The latter input is supplied to a steering winding 116 which links the two output apertures 114 and 115 in an opposed sense. There is another steering winding 117 threading the output apertures 114 and 115 in the direction opposite to that in which they are threaded by winding 116. The second steering winding 117 receives binary zero input from the shaper 33.

Since in the example being discussed the seventeenth binary bit was a "one," it will be received by steering winding 116 and will hold flux down in the inner leg at aperture 114 such that the "one" on the input winding 111 causes flux to switch about the upper major aperture in a path which includes the outer leg at aperture 114. When the core is subsequently blocked by a phase A pulse in winding 97, the flux in the outer leg at aperture 114 is reversed. The flux reversal induces sufficient voltage in winding 118 to turn transistor 119 on.

The firing of transistor 119 produces a current pulse in reading winding 103 for core 92 which again reverses flux about the output aperture 109, and this time the voltage induced in the output winding 122 is sufficient and of the correct polarity to turn transistor 123 on. The firing of transistor 123 produces an output in its collector circuit which is supplied to the message length counter 43 causing it to register a count of 17. The output from transistor 123 represents a "correct comparison" output, and as mentioned previously, the message length counter 43 is really counting comparisons after the first sixteen bits of the message.

In the illustrated embodiment, the correct comparisons are counted, but it would be satisfactory to trigger the incorrect message output whenever an incorrect comparison is detected. Message security logic which operates to terminate decoding whenever an incorrect comparison is detected is described in a copending application Ser. No. 299,727, filed on August 5, 1963, by the present inventors. The use of such circuitry is within the scope of the present invention.

There are four combinations of inputs which may be received by the core 91. A zero on winding 111 tends to switch flux about the lower major aperture 110. A zero on winding 117 holds flux down in the inner leg at aperture 115 so that flux must switch at the outer leg at aperture 115 when it is reversed about the major aperture 110. Flux is then continuous about the output aperture 115, and when the core is blocked at phase A time by the pulse appearing on winding 97, the flux in the outer leg at aperture 115 is switched inducing sufficient voltage in the output winding 118 to fire transistor 119. The firing of transistor 119 produces an output from the gate core 92 in the manner described previously to send a "correct comparison" pulse to the message length counter 43.

Any combination where the two inputs differ (i.e., either a one and zero, or a zero and one) will not switch flux in the output winding of core 91. For example, a zero on winding 117 will hold flux down in the outer leg at aperture 114, and a one in winding 111 at the same time will switch flux about the upper major aperture 109, but flux switching will be confined to the inner leg at aperture 114. Thus, when the core is blocked by the next phase A pulse, there will be no flux switching in the outer leg at aperture 114, and consequently, no voltage will be induced in the output winding 118. Similarly, a one on winding 116 holds flux down in the outer leg at aperture 115 so that a concurrent zero on winding 111 will produce flux switching only at the inner leg adjoining aperture 115. The subsequent phase A pulse will block core 91, but no output will be produced from the transistor 119.

The bit-by-bit comparison technique just described gives a high degree of message security. It will be understood that the chance for invalid comparison is very small indeed when the two halves of the message are compared on a bit-by-bit basis. It is possible that over an extended period of time, noise on the communication channel will reduce a one bit to a neuter, or perhaps even invert it to a zero bit. However, it is extremely unlikely that noise would do this in both the first and second frames of the message at exactly the same time slots, such as would produce a comparison output even though the message was not correct. It is also evident that the message security circuitry counts comparisons and accumulates counts only for the duration of a message and a few extra bit-times which together constitute a comparison cycle. The counting circuit 43 is reset after each comparison cycle. Therefore, the determination of whether the received signal is a correct message must occur within a limited-time comparison cycle, and this technique affords a greater degree of security than would be the case if the comparison cycle were longer (even continuous), or absent.

Figure 12:
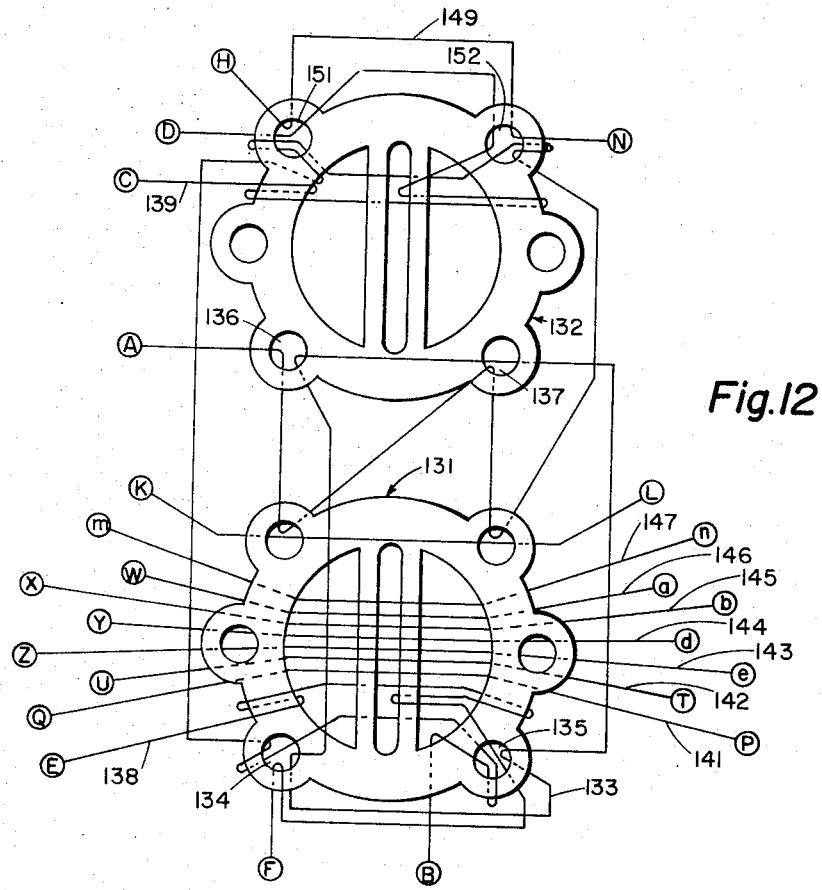
FIG. 12 is circuit diagram for a composite encoder and shift register included in the central station equipment of FIG. 8.
Figure 13:
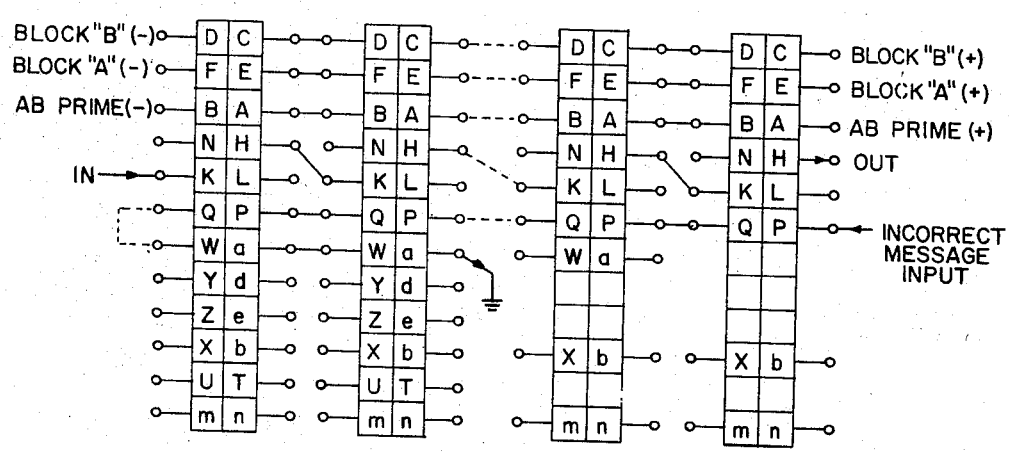
FIG. 13 is a schematic diagram which illustrates an interconnection scheme used for the circuit of FIG. 12.

The incorrect message output from the transistor 78 (FIG. 9) goes to the encoder 44 (FIG. 8) which is preset to the smear code. An example of circuitry for the encoder 44 and the parallel-to-serial shift register 45 (FIG. 8) is shown in FIGS. 12 and 13. Actually, the encoder and shift register functions are combined in a single circuit, and it may be considered that certain windings for the cores of the shift register serve the encoding function.

Referring first to FIG. 12, there is shown a pair of cores 131 and 132 of the true and complement type. The output winding 133 for the core 131 links apertures 134 and 135 of that core and also links apertures 136 and 137 of the other core 132. This is the usual connection between the cores of a shift register as described in application Ser. No. 109,440 referred to above.

The blocking windings for the two cores are identified as 138 for core 131 and 139 for core 132. The circuit from terminal A to terminal B includes the priming windings for both of the cores. One input winding 141 (between terminals P and Q) for the core 131 has a single turn on both halves of the core annulus. The other input windings 142–147 each have two turns on both halves of the core annulus.

The incorrect message pulse from the counter/decoder 43 passes first through the input winding 141 (PQ), and is in a sense to set a binary zero into the core 131 by establishing continuous flux about aperture 135. If any current flows back through one of the two-turn windings 142–147, it will cancel out the effect of the current in winding 141 such that a binary one is loaded into the core rather than a zero. In this manner, the encoder can be prewired so as to set either a one or a zero into the core 131, and all like cores of the shift register, depending upon the interconnections between winding 141 and the windings 142–147.

The complete encoder and shift register includes several stages like the single stage shown in FIG. 12. The output winding 149 of core 132 links the output apertures 151 and 152 and also links the input apertures of a core of the succeeding stage.

FIG. 13 is a code diagram showing the manner in which the cores of the composite encoder and shift register are threaded by windings so as to encode a smear command in response to the incorrect message pulse supplied from the message length counter. This particular diagram shows the coding for only four stages; i.e., the first two stages and the last two stages of the shift register. It will be understood that similar coding is employed for the intermediate stages.

The first core of each stage is referred to as the A core, and the second core is referred to as the B core. The letters inside the blocks in FIG. 13 correspond to the letters at the terminals for the windings of the cores 131 and 132 of FIG. 12.

As shown, blocking pulses for the B cores are supplied to windings CD which are connected in series to all B cores. Blocking pulses for the A cores are supplied to windings EF which are likewise connected in series to all of the A cores. Priming pulses are supplied to windings AB which are connected in series to all of the A and B cores.

An example will be given to explain further the interconnection scheme for the input windings. This example will be for the encoding of a smear command which consists of a series of zeros with two one-bits at the end of the command. The incorrect message input, as indicated at the right-hand side of FIG. 13, goes through all of the PQ windings for the A cores of the shift register. After coming out of the Q terminal for the A core of the first stage of the register, it will go back into the W terminal for that core passing through the Wa winding for the A core of the first stage and then through the Wa winding for the A core of the second stage of the register. The "incorrect message" pulse passing through these windings will load a binary one into the A cores of the first two stages but will load zeros in the other cores of the register since it does not pass through any two-turn winding on those cores. Thus, when the message is shifted out of the register in serial form in response to clocking pulses, it will consist of a series of "zeros" followed by a "one" and then another "one" at the end of the message. From the shift register, the smear command goes to the transmitter 26 where it is transmitted to all of the remote stations. The system then goes through the "smear" operating cycle as previously described.

Summary

The invention provides a quiescent supervisory control system in which all remote stations are capable of randomly transmitting messages via a common communication channel. The message traffic control and security circuits of the system detect incorrect messages, and messages which have been smeared either by mutual interference between messages or by noise on the communication channel, and causes retransmission of those messages to assure that they will eventually be received correctly. The traffic control and security features can be implemented in a straightforward manner, and it is advantageous, though not essential, to implement the circuitry with multiaperture cores. Thus, the reliability of the supervisory control system is increased without requiring complex and expensive circuitry.

We claim:
1. A supervisory control system of the quiescent type in which remote stations are adapted to transmit messages randomly to a central station via a communication channel, said system including in combination:
 (a) a first sub-system adapted to be located at a central station and including transmitting means, receiving means, and data processing means,
 (b) a plurality of second sub-systems each adapted to be located at a remote station and each including transmitting means, receiving means, and data processing means,
 (c) timing means in said data processing means of each of said second sub-systems, said timing means being responsive to message transmission by the associated second transmitting means to supply a time limited signal indicating that a transmission of a given message is effected, and each of said timing means having a timing cycle of a duration different from that of the timing means of every other second sub-system,
 (d) message security means in said data processing means of said first sub-system for detecting incorrect incoming messages,
 (e) encoding means in said data processing means of said first sub-system controlled by said message security means for initiating transmission of a uniquely coded command by said first transmitting means in response to detection of an incorrect message by said message security means,
 (f) decoding means in said data processing means of each of said second sub-systems capable of decoding said uniquely coded command,

(g) and means in each of said second sub-systems jointly responsive to said timing means time-limited signal and said decoding means decoding said uniquely coded command for causing retransmission of said given message after said second timing cycle.

2. A supervisory control system of the quiescent type in which a plurality of remote stations are adapted to transmit messages randomly to a central station via a communication channel common to said remote stations, said system including in combination:
 (a) a central sub-system including first transmitting means, first receiving means, and first data processing means all located at a central station,
 (b) a plurality of remote sub-systems each located at a remote station and each including second transmitting means, second receiving means, and second data processing means,
 (c) timing means in each of said second data processing means responsive to message transmission by the associated second transmitting means to initiate timing for possible retransmission of said message, each of said timing means including a first timer for establishing a first timing cycle initiated by transmission of said message and a second timer for establishing a second timing cycle following said first timing cycle of a duration different from the second timing cycle of each of the other second timers,
 (d) message security means in said first data processing means at said central station for detecting incorrect messages transmitted from remote stations,
 (e) encoding means in said first data processing means controlled by said message security means for initiating transmission of a uniquely coded command by said first transmitting means responsive to detection of an incorrect message by said message security means,
 (f) a decoder in each of said second data processing means capable of decoding said uniquely coded command,
 (g) and means with each of said timing means requiring actuation by said first timer and also actuation by said decoder responsive to reception and decoding of a said uniquely coded command during said first timing cycle for causing retransmission at the end of said second timing cycle of a message initially transmitted by the associated second transmitting means at the beginning of said first timing cycle.

3. A supervisory control system of the quiescent type in which remote stations are adapted to transmit messages randomly to a central station, said system having control circuitry for assuring the eventual correct reception of messages at said central station and including in combination:
 (a) a central sub-system including first transmitting means, first receiving means, and first data processing means,
 (b) a plurality of remote sub-systems each including second transmitting means, second receiving means, and second data processing means,
 (c) timing means in each of said second data processing means responsive to message transmission by the associated second transmitting means to initiate timing for possible retransmission of said message, each of said timing means including a first timer for establishing a first timing cycle beginning with such message transmission and of a duration long enough to allow for transmission of said message to a central station and return of a command message from said central station, and each of said timing means further including a second timer for establishing a second timing cycle of a duration different from that of each of the other second timers,
 (d) message security means in said first data processing means for detecting incorrect incoming messages,
 (e) encoding means in said first data processing means controlled by said message security means for initiating transmission of a uniquely coded command message by said first transmitting means responsive to detection of an incorrect message by said message security means,
 (f) decoding means in each of said second data processing means capable of decoding a said uniquely coded command message,
 (g) and means with said timing means controlled jointly by said decoding means and said first timer responsive to reception and decoding of a said uniquely coded command message if received during said first timing cycle for causing retransmission after said second timing cycle of a message originally transmitted by the associated second transmitting means at the beginning of said first timing cycle.

4. A supervisory control system of the quiescent type in which remote stations are adapted to transmit binary coded messages randomly to a central station, said system including in combination:
 (a) first transmitting means, receiving means and data processing means all adapted to be located at a central station,
 (b) second transmitting means, receiving means and data processing means all adapted to be located at a remote station,
 (c) an encoder in said second data processing means for encoding messages according to a binary code into two identical successive message frames,
 (d) timing means in said second data processing means responsive to message transmission by said second transmitting means to initiate a timing cycle for possible retransmission of said message,
 (e) message security means in said first data processing means for detecting incorrect incoming messages, said message security means including comparison circuit means for comparing the successive bits of the first frame of a message with the successive bits of the second frame thereof on a bit-by-bit basis so as to provide a correct message output when the corresponding bits of said frames are the same and an incorrect message output when any two corresponding bits of said frames are unlike each other,
 (f) encoding means in said first data processing means controlled by said message security means for initiating transmission of a uniquely coded command by said first transmitting means responsive to an incorrect message output from said message security means,
 (g) decoding means in said second data processing means capable of decoding a said uniquely coded command,
 (h) and means with said timing means controlled by said decoding means for causing retransmission of said message after said timing cycle.

5. The supervisory control system of claim 4 in which said encoding circuit means of said first data processing means comprises a multiaperture core shift register having windings on the cores thereof for accomplishing the encoding function.

6. The supervisory control system of claim 4 wherein said system further includes a shift register in said first data processing means for temporarily storing the bits of incoming messages, said shift register having a bit capacity to store only one message frame such that the bits of the first message frame are shifted out of said register serially as the bits of the second message frame enter said shift register serially, and means for supplying the delayed first message frame from said shift register to said comparison circuit means for camparison thereby with said second message frame.

7. The supervisory control system of claim 6 in which said message security means further includes a counter for counting the bits of the first message frame followed by counting of comparison outputs from said comparison circuit means.

8. The supervisory control system of claim 7 in which said comparison circuit means includes a multiaperture core comparator for accomplishing the bit-by-bit comparison, and a multiaperture core gate for gating the bits of the incoming first message frame to said counter and for gating comparison outputs from said comparator to said counter during the second message frame.

9. The supervisory control system of claim 8 in which said multiaperture cores are of the true and complement type with output windings thereon adapted to provide noise cancellation.

10. A supervisory control system of the quiescent type in which binary coded messages may be transmitted between a central station and a plurality of remote stations via a communication channel common to said remote stations, said system including in combination:
 (a) a central sub-system adapted to be located at a central station and including first transmitting means, first receiving means and first data processing means,
 (b) a plurality of remote sub-systems adapted to be located respectively at different remote stations and each including second transmitting means, second receiving means and second data processing means,
 (c) first and second encoding means in said first and second data processing means respectively for encoding messages according to a binary code into two identical successive message frames,
 (d) first and second message security means in said first and second data processing means respectively for detecting incorrect messages, said message security means each including comparison circuit means for comparing the successive bits of the first frame of a message with the successive bits of the second frame thereof on a bit-by-bit basis to provide a correct message output when the corresponding bits of said frames are the same and an incorrect message output when any two corresponding bits of said frames are unlike each other,
 (e) said first encoding means in said first data processing means having means for initiating transmission of uniquely coded commands by said first transmitting means to all of said remote stations,
 (f) and decoding means in said second data processing means capable of decoding said uniquely coded commands.

11. A supervisory control system of the quiescent type in which remote stations are adapted to transmit messages randomly to a central station via a communication channel, said system including in combination:
 (a) a first sub-system adapted to be located at a central station and including transmitting means, receiving means, and data processing means,
 (b) a plurality of second sub-systems each adapted to be located at a remote station and each including transmitting means, receiving means, and data processing means,
 (c) timing means in each of said second sub-systems, said timing means being responsive to message transmission by the associated second transmitting means to initiate a timing cycle for retransmission of said message, and each of said timing means having a timing cycle of a duration different from that of the other timing means,
 (d) message security means in said data processing means of said first sub-system for differentiating between correct and incorrect incoming messages,
 (e) encoding means in said data processing means of said first sub-system controlled by said message security means for initiating transmission of a uniquely coded command by said first transmitting means to thereby control said timing means,
 (f) decoding means in said data processing means of each of said second sub-systems capable of decoding said uniquely coded command and supplying a retransmit signal in response thereto,
 (g) and means in each remote station with each said timing means responsive to said retransmit signal for causing retransmission of said message after said timing cycle.

12. Supervisory control apparatus having a plurality of remote stations adapted to transmit messages randomly to a central station via a communication channel, and including in combination a timer in each of said remote stations responsive to transmission of a message by the associated remote station to initiate a timing cycle for possible retransmission of the message, each of said timers having a timing cycle of a duration different from that of the other timers to assure staggering of repeated messages from different remote stations, message security circuitry in said central station for differentiating between correct and incorrect incoming messages, an encoder in said central station controlled by said message security circuitry for initiating transmission of a uniquely coded all-stations message to said remote stations to thereby control the timers of those remote stations, a decoder in each of said remote stations capable of decoding the aforementioned all-stations message, and control circuitry associated with said timers and decoders in each of said remote stations for causing retransmission of remote-to-central messages at the end of the corresponding timing cycle.

13. Apparatus as claimed in claim 12 and further including another timer in each of said remote stations for establishing a preliminary timing cycle beginning with remote to central transmission and of a duration long enough to allow for return of a message from said central station, said control circuitry being actuated jointly by said decoder and said preliminary timer to initiate the timing cycles of different lengths.

14. Apparatus as claimed in claim 13 in which said encoder of said central station is operative to initiate said all-stations message in response only to an incorrect message output from the associated message security circuitry.

15. Apparatus as claimed in claim 14 in which said control circuitry initiates the timing cycles of different lengths only upon reception by said remote stations of said uniquely coded all-stations command within the duration of said preliminary timing cycle.

16. Apparatus in accordance with claim 12 in which said message security circuitry of said central station includes a counter for counting the bits of incoming messages to determine whether the message contains the correct number of bits.

17. A digital communication system having a central station and a plurality of remote stations joined by a common communication channel with the central station having first transmitting means, first receiving means, and data processing means, and each of the remote stations having second transmitting means, second receiving means, and second data processing means, and the stations interchanging digitally encoded signals over the common channel, the improvement including in combination,
 the first and second data processing means being operative to effect a first type of communication operation between the central and remote stations,
 message security means in the first data processing means examining each received message for correctness and supplying a first signal upon detection of an incorrect message,
 encoding means responsive to said first signal to supply a unique command signal to the first transmitting means for transmission to all the remote stations,
 each remote station having means for indicating a recent message transmission therefrom,
 each of the second data processing means being independently jointly responsive to receipt of said unique command signal and the respective recent message transmission indications to initiate a retransmission of each of said recent messages, respectively, and each second data processing means including a timing means preset to time out a given cycle, the duration of which is different than the duration of any other remote station given cycle and inhibiting such retransmissions until expiration of said given cycles, respectively.

References Cited

UNITED STATES PATENTS

| | | | |
|---|---|---|---|
| 3,244,804 | 4/1966 | Wittenberg | 178—3 |
| 3,244,805 | 4/1966 | Evans | 340—163 X |
| 3,252,138 | 5/1966 | Young | 340—151 X |

NEIL C. READ, *Primary Examiner.*

D. YUSKO, *Assistant Examiner.*